United States Patent [19]

Rasmussen et al.

[11] 4,218,590

[45] Aug. 19, 1980

[54] KEY TELEPHONE SYSTEM HAVING AUTOMATIC EXCLUSION CIRCUIT FOR LINE PRIVACY

[75] Inventors: Harry R. Rasmussen, Tacoma; Gene A. Kimzey, Puyallup, both of Wash.

[73] Assignee: Crest Industries, Inc., Puyallup, Wash.

[21] Appl. No.: 7,202

[22] Filed: Jan. 29, 1979

[51] Int. Cl.² .............................................. H04M 1/68
[52] U.S. Cl. .................................. 179/99 E; 179/39
[58] Field of Search ............. 179/99, 18 AD, 38, 17 B, 179/39, 18 DA

[56] References Cited

U.S. PATENT DOCUMENTS

| | | | |
|---|---|---|---|
| 3,499,121 | 3/1970 | McIntosh et al. | 179/17 B |
| 3,514,544 | 5/1970 | Chambers, Jr. | 179/17 B |
| 3,725,601 | 4/1973 | Jetzt et al. | 179/99 |
| 3,860,763 | 1/1975 | Sudoh et al. | 179/99 |
| 3,941,943 | 3/1976 | Matheny | 179/99 |
| 3,961,144 | 6/1976 | Hirate | 179/99 |
| 4,000,376 | 12/1976 | Springer | 179/99 |
| 4,039,759 | 8/1977 | Taylor | 179/99 |
| 4,053,720 | 10/1977 | Wycheck et al. | 179/99 |
| 4,075,434 | 2/1978 | Merritt, Jr. | 179/99 |
| 4,117,274 | 9/1978 | Cannon et al. | 179/99 |

*Primary Examiner*—Gerald Brigance
*Attorney, Agent, or Firm*—Christensen, O'Connor, Johnson & Kindness

[57] ABSTRACT

The exclusion circuit disclosed herein provides for line privacy in a key telephone system of the type in which a control unit provided at each of a plurality of stations can be operated to selectively connect one or more telephone lines to the phone set at the corresponding station. Within each control unit, an exclusion circuit is provided for each telephone line that extends to the control unit, and is connected so as to cooperate with a line condition sensing circuit, a line switching relay, a relay latching circuit and a manually operated line selector switch, all of which are associated with the same line as the exclusion circuit. When the telephone line is in an idle condition or a hold condition, the exclusion circuit is in a nonexclusion, quiescent mode during which the manually operated selector switch is effective to switch the line relay and, in conjunction with the line condition sensing circuit, cause the relay latching circuit to latch the line relay in a condition that connects the telephone line to the station set for so long as the telephone line remains busy (in an off-hook condition). To prevent other stations from coming onto a busy line the exclusion circuits associated with the same telephone line, but located at the other stations, respond to the busy condition on the line, as detected by the associated sensing circuits, and after a predetermined delay interval such other exclusion circuits assume an exclusion mode in which the associated line selector switches are no longer effective to operate the corresponding line relays. The phone stations, other than the station that initially picks up the telephone line, are thus unable to connect the associated phone sets to the line. When the line becomes idle or is placed on hold, and either of those conditions are detected by the sensing circuits at the various stations, the associated exclusion circuits are restored to their quiescent mode, enabling any one of the stations to pick up the line.

10 Claims, 2 Drawing Figures

KEY TELEPHONE SYSTEM HAVING AUTOMATIC EXCLUSION CIRCUIT FOR LINE PRIVACY

BACKGROUND

The invention pertains to automatic exclusion circuitry for establishing line privacy in a multistation key telephone system.

In telephone systems having two or more phone stations capable of being connected to a common telephone line, it is many times desirable to provide line privacy for a person using the telephone line at a first of the stations by preventing any remaining stations from picking up the line after a telephonic communication has been initially established at the first station. To provide such privacy, various circuits and switching devices have been developed for excluding subsequent connections to a busy line, and these circuits and devices are commonly referred to as exclusion circuits or exclusion switches.

In some cases, the exclusion is effected by manually operating an exclusion switch mounted on or adjacent the telephone set. Preferably, however, the privacy feature is provided by an automatic exclusion circuit in which the users of the telephone system need not remember to throw a switch to activate the exclusion mode, and need not remember to return the switch to the nonexclusion position upon terminating the phone call.

Accordingly, it is an object of the present invention to provide an automatic exclusion circuit for a key telephone system of the type in which the telephone set at each of the plurality of stations is normally disconnected from the common telephone line and is selectively connected to the line by a line switching device such as a relay that in turn is controlled by a latching circuit operating in response to a manually actuated line selector switch and a line condition sensing circuit.

A related object is to provide such an exclusion circuit for a key telephone system of the above type and wherein the system is further characterized in that each station has a separate line switching device, latching circuit, line selector switch and line condition sensing circuit for each of a plurality of telephone lines that are connected to the station and available thereat for individual or concurrent connection to the station set.

SUMMARY OF THE INVENTION

The exclusion circuit in accordance with the invention is incorporated into a control unit that is provided at each station of a multistation key telephone system (KTS), and within each such control unit a separate exclusion circuit is provided for each of the telephone lines that are available at the station for connection to the station set. The exclusion circuit cooperates with those components of the control unit that are associated with a given telephone line, which components are known per se and include a line switching device for selectively connecting the given telephone line to the station set, a latching circuit, a manually operable line selector switch (sometimes called a line pick-up key), and a line condition sensing circuit. In this type of KTS, the line switching device is operated initially by manual actuation of the selector switch causing the line switching device to connect the line to the station set. At the same time that the line selector switch is operated, the telephone set is lifted off-hook causing the line condition sensing circuit to detect an off-hook condition, and that detected condition together with the still manually actuated condition of the selector switch causes the latching circuit to latch and hold the line switching device in a switched state, whereafter the selector switch can be released.

The exclusion circuit of the invention comprises a signal controlled gate and a timing circuit. The gate is switchable between a quiescent, nonexclusion mode during which the selector switch is effective to operate and latch the line switching device, and a nonexclusion mode during which manual actuation of the selector switch is ineffective to operate the line switching device. The timing circuit is responsive to the line condition sensing circuit to cause the gate to switch from its nonexclusion mode to its exclusion mode after a predetermined interval following a change of the line condition from on-hook (idle), or hold, to off-hook (busy). The timing circuits and gates of those exclusion circuits associated with the same telephone line but located at different stations, jointly respond to the change in condition on the line from idle or hold to busy, to assume the exclusion mode after the specified interval.

In a preferred form of the invention, the exclusion circuit further comprises a bistable circuit which is effective to inhibit the exclusion mode of the timing circuit and signal controlled gate in the following case. A bistable circuit is preferably provided in the exclusion circuit in a key telephone system of the type in which the control unit at each station receives two or more telephone lines, and is capable of connecting the available telephone lines to the single station set separately, or at the option of the user, jointly. When the lines are jointly connected to the set, a multiparty conference call is established between the station set and the two or more telephone lines available at that station. To establish such a conference call in this type of key telephone system, the two or more line selector switches, one for each available line, are simultaneously actuated and the associated line switching devices are jointly operated and latched, concurrently connecting the lines to the station set. In such a KTS, the above mentioned bistable circuit of the exclusion circuit is responsive to a signal from the associated line selector switch and controlled gate to switch from a normal enable exclusion state to an exclusion inhibit state in which the exclusion mode of the gate is inhibited so long as the line continues to remain in a busy condition. As a result, the line selector switch at the station which initially caused the busy condition on the line, is available for joint actuation along with one or more other selector switches at the same station for commanding the control unit to establish the above mentioned multipoint conference call.

To provide a complete disclosure of the invention, reference is made to the appended drawings and following description of one preferred embodiment.

DETAILED DESCRIPTION

Figure 1:
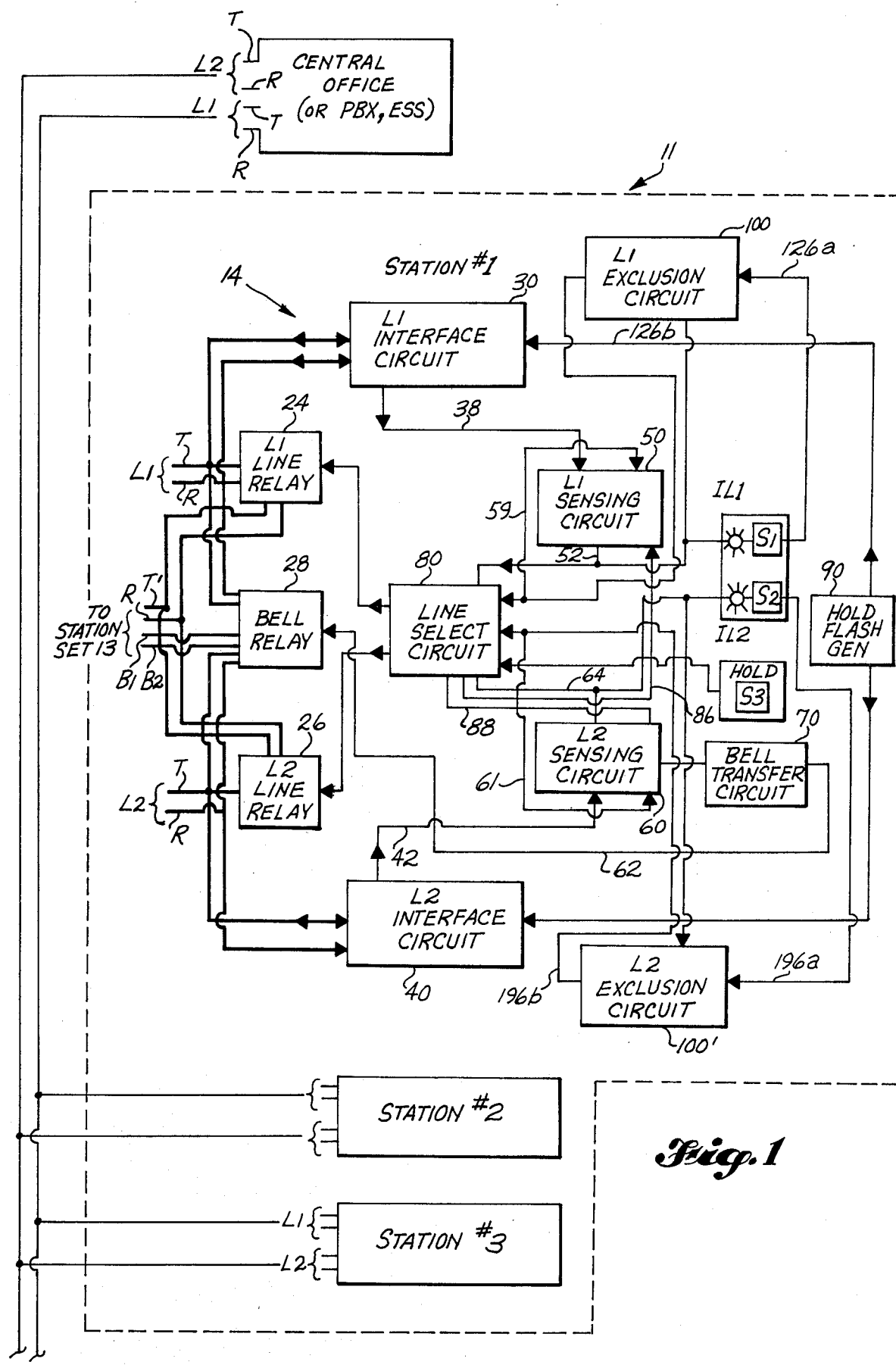
FIG. 1 is a block diagram of a key telephone system incorporating the exclusion circuit of the invention for providing line privacy.

With reference to FIG. 1, a key telephone system (KTS) 11 is used in conjunction with first and second telephone lines L1 and L2 extending from a central office 12 (which may also be a private branch exchange-PBX, or an electronic switching system-ESS). At each of a plurality of phone stations #1, 2 and 3, KTS 11 provides a control unit such as illustrated by unit 14 at station #1, which control units are of the type disclosed in U.S. Pat. No. 4,132,860 issued Jan. 2, 1979 for HOLD CONTROL FOR KEY TELEPHONE SYSTEM to Harry R. Rasmussen, and in U.S. Pat. No. 4,133,985, issued Jan. 9, 1979 for KEY TELEPHONE SYSTEM to Harry R. Rasmussen et al. The exclusion circuitry of the present invention is incorporated into each of these control units, as indicated by exclusion circuits 100 and 100' for lines L1 and L2, respectively, of control unit 14. To provide a complete description of the environment in which exclusion circuits 100 and 100' are incorporated, the disclosures in the above mentioned U.S. patents are expressly incorporated herein by reference. The reference numerals used in FIG. 1 to identify those components of control unit 14 that are more fully and specifically disclosed in the above mentioned U.S. patents, are identified by reference numerals that correspond to those use in the referenced patents.

Thus, each of stations #1, 2 and 3 of KTS 11 are equipped with a control unit, identical to unit 14 shown for station #1, and a telephone set, such as referenced on the left-hand side of control unit 14 as station set 13. The telephone lines L1 and L2 are connected in parallel to the control units associated with stations #1, 2 and 3 so that both telephone lines are available at each station for connection to the station set. Lines L1 and L2 include at least a tip conductor and a ring conductor, referenced in the drawings as T and R. With reference to station #1, the tip and ring conductors of L1 and L2 are arranged to be selectively coupled by L1 and L2 line relays 24 and 26 to common tip and ring outputs, designated T' and R', to which the tip and ring leads of station set 13 are connected. A bell relay 28 serves to transfer the ringing signals appearing on either of lines L1 or L2 to common output ring lines B1 and B2 that are connected to the bell or other signalling device of station set 13.

Additionally, and as fully described in the above mentioned U.S. patents, control unit 14 includes a line interface circuit 30, a sensing circuit 50, a line condition indicating lamp IL1 and a line selector switch S1 which are associated with line L1. These components cofunction with the L1 exclusion circuit 100 of the present invention. Similarly, interface circuit 40, sensing circuit 60, line condition lamp IL2 and line selector switch S2 are associated with telephone line L2, and cofunction with the L2 exclusion circuit 100' of the present invention. Common to both lines L1 and L2 is a bell transfer circuit 70 that operates bell relay 28 to ensure that a ringing signal appearing on either of lines L1 or L2 is applied to the bell of common station set 13. Additionally, a line select circuit 80 is provided for coordinating the operations of line relays 24 and 26 in response to sensing circuits 50 and 60 and line select switches S1 and S2; a hold switch S3 serves to selectively place one or the other of lines L1 and L2 in a hold condition; and a hold flash generator 90 that is a component of the hold circuitry generates a fluctuating hold signal which is applied to the held line or lines and is visually displayed by a flashing condition on one or both of indicator lights IL1 and IL2.

Line interface circuits 30 and 40 are respectfully connected to lines L1 and L2 and include electrical isolation components that enable signal information to be coupled between the telephone lines L1 and L2 and the line condition sensing and hold signal generating circuitry of unit 14 without adversely affecting the operation of the overall telephone system including central office 12. Sensing circuits 50 and 60 are respectfully connected to interface circuits 30 and 40 by means of connections 38 and 42 and serve to detect the operating conditions on lines L1 and L2, namely whether on-hook (idle), off-hook (busy), holding or ringing. Indicator lights IL1 and IL2, connected to sensing circuits 50 and 60 by connections 52 and 64, respectively, display the instantaneous operating conditions of the associated lines. Line select circuit 80 is responsive to signals from sensing circuits 50 and 60 received over connections 52 and 64, respectively, for controlling the operating states of line relays 24 and 26. Additionally, line select circuit 80, acting in response to hold switch S3 develops hold initiating signals which are applied via connections 86 and 88 to hold control circuitry within sensing circuits 50 and 60 respectively, for placing one or both lines in a hold condition. Connections 59 and 61 are responsive to signals from the line selector switches S1 and S2, respectively, to ensure that when the hold switch S3 is actuated, only that telephone line connected to the station set 13 will be placed in a hold condition. Line select circuit 80 also provides an automatic disconnect feature, and enables each station to establish a conference call jointly with the plurality of lines available at the station. The automatic disconnect occurs when one of the incoming lines is connected to the station set, and the selector switch associated with the opposite line is actuated, causing the first mentioned line to be automatically "dumped", i.e., disconnected from the station set. The conference call is effected by simultaneously actuating both selector switches so as to override the automatic disconnect operation, and cause both line relays 24 and 26 to operate and concurrently connect both incoming lines to the station set.

Now, in accordance with the present invention, each control unit, such as unit 14 as shown in FIG. 1, is provided with an exclusion circuit, one for each telephone line serviced by the control unit. Thus, exclusion circuit 100 is associated with telephone line L1, and exclusion circuit 100' is associated with telephone line L2. Circuits 100 and 100' are respectively connected in circuit with the associated line selector switches S1 and S2, sensing circuits 50 and 60, and the line select circuit 80. As described more fully below, each exclusion circuit functions to interrupt the response of the line select circuit 80 to the operation of the associated line selector switch, S1 or S2, after a predetermined delay interval following the occurrence of an off-hook condition on the associated telephone line, as detected by the corresponding sensing circuit, either circuit 50 or 60.

Thus, for example, so as long as line L1 remains on-hook, the associated exclusion circuit 100 of control unit 14 remains in a quiescent, nonexclusion mode and enables line select circuit 80 to operate the L1 line relay 24 in response to selector switch S1. Station 14 can therefore answer or place a call over line L1 by using set 13 and actuating selector switch S1. The thusly established call will continue in a normal manner until terminated, either by going back on-hook or by placing the line in a hold condition, as fully described in the aforementioned U.S. patents. At a timed interval after the call is established over line L1 at station 14, the corresponding line L1 exclusion circuits at each of the other stations, i.e., stations 2 and 3, of system 11, switch from the above described quiescent mode to an exclusion mode during which the line select circuits for stations 2 and 3 (corresponding to circuit 80 of unit 14 at station 1) are unresponsive to actuation of the associated L1 line selector switches, corresponding to switch S1 of unit 14. Thus, none of the other stations are able to connect into line L1 after a call has been established over L1 at station #1. When the call is terminated, or line L1 is placed on hold, the L1 exclusion circuits at each of the excluded stations #2 and #3, revert to their quiescent modes so that a call can be established at either one of these stations. Similarly, if L1 at station #2 had initiated the call, then the L1 exclusion circuits at stations #1 and #3 would act to exclude these latter stations from connecting into line L1, and likewise if station #3 first established a call over L1, stations #1 and #2 would be excluded by their respective L1 exclusion circuits.

Figure 2:
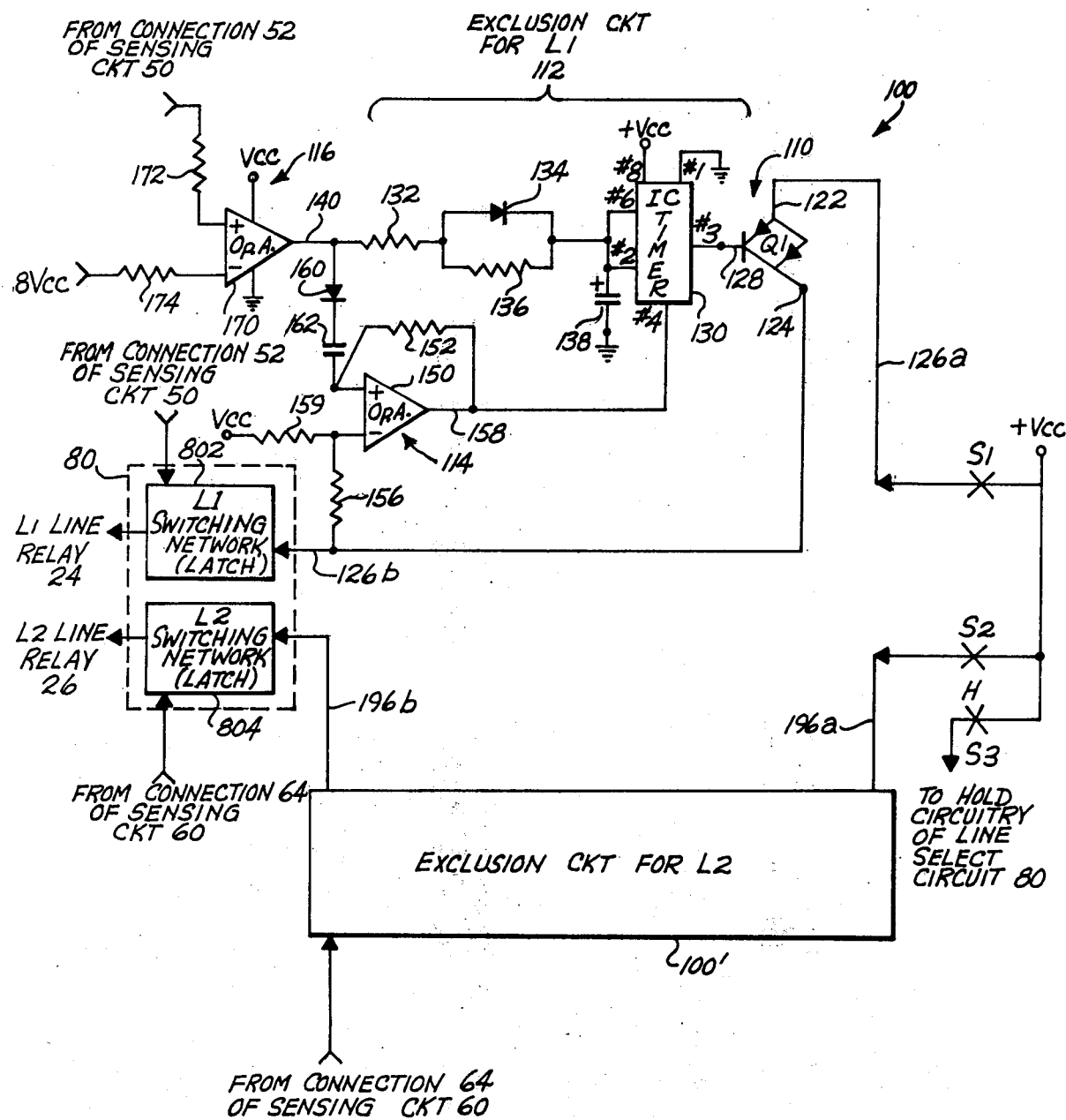
FIG. 2 is a composite block and schematic diagram of the exclusion circuit according to one embodiment of the invention.

With reference to FIG. 2, one specific embodiment of the L1 exclusion circuit 100 is shown in schematic detail. The other individual exclusion circuits, including the L2 exclusion circuit 100' of unit 14, and the corresponding L1 and L2 exclusion circuits of stations #2 and #3, may be identical to circuit 100, and thus only the latter is shown in detail. The principal components of circuit 100 comprise a signal controlled gate 110 provided by a Darlington pair transistor switch Q1, a timing circuit 112 and a bistable circuit 114. Additionally, a comparator circuit 116 is used as a buffer circuit for coupling line condition signals from sensing circuit 50 to timing circuit 112 and bistable circuit 114.

Transistor switch Q1 includes a common emitter input 122 and a common collector output 124 which are serially connected with leads 126a and 126b between the normally open contacts of selector switch S1 and the L1 relay switching network (latch) 802 of line select circuit 80. A control input 128 provided at the base of Q1 receives a control signal for switching Q1 between relatively low and high impedance conditions that respectively provide the quiescent and exclusion modes described briefly above. During the quiescent or nonexclusion mode (low impedance state of Q1) momentary closure of S1 causes the supply voltage +Vcc to be coupled via lead 126a, Q1 and lead 126b to the L1 switching network 802 so as to operate and latch the associated L1 line relay 24. During the exclusion mode (high impedance state of Q1), the supply voltage signal normally communicated to network 802 when switch S1 is momentarily closed is blocked by Q1, and thus network 802 and line relay 24 are unresponsive to the actuation of switch S1.

Timer circuit 112 includes an integrated circuit timer 130 which operates in conjunction with a nonlinear diode-resistive-capacitive delay network formed by resistor 132, diode 134, resistor 136 and a capacitor 138. Resistor 132 is connected in series with the parallel network of diode 134 and resistor 136 which in turn is connected in series with capacitor 138 to ground. The junction between capacitor 138 and the parallel network of diode 134 and resistor 136 is jointly connected to input terminals #2 and #6 of timer 130. An output terminal #3 of timer 130 is connected to the base input 128 of Q1. Timer 130 operates from supply voltage +Vcc connected to terminal #8 and a supply voltage return terminal #1 is connected to ground. Terminal #4 is an enable/inhibit input for timer 130 that is controlled by bistable circuit 114 as described more fully below.

Timer circuit 112 is constructed to provide a predetermined time delay in response to the receipt of an off-hook indicating signal from sensing circuit 50, before Q1 of gate 110 had been switched from its quiescent to its exclusion mode. For this purpose, any number of timing circuits can be employed. In this instance, an integrated circuit timer 130 is employed, which is a commercially available integrated circuit device commonly designated in the electronics industry as a 555 timer. It is a multipurpose timer circuit that can be adapted for performing a variety of timing and control functions depending upon the external circuitry with which it is associated. Details of the construction and operation of a 555 timer are available from the various companies that manufacture the device including National Semiconductor Corporation of Santa Clara, Calif., and Raytheon Corporation of Boston, Mass. Also, the operating characteristics are summarized in the aforementioned U.S. patents.

For the purpose of understanding the present invention only a brief discussion of the switching characteristics of timer 130 is needed. Timer 130 has a set state and a reset state. In the set state, the output at terminal #3 is low (at or near ground potential) and thus Q1, being of PNP polarity, is turned on (i.e., provides a low impedance path) when timer 130 is set. To place timer 130 in the set state, input terminals #2 and #6 are high (at or near +Vcc). Timer 130 is switched from the set state to a reset state when the voltage at input terminals #2 and #6 decreases from +Vcc to below ⅓ +Vcc. In the reset state the timer's output terminal #3 swings high (at or near +Vcc) and responsively transistor Q1 is turned off, switching gate 110 to the exclusion mode. Timer 130 reverts to the set state when the voltage at input terminals #2 and #6 rise above ⅔ Vcc. In order for timer 130 to switch between the set and reset states, the voltage at enable/inhibit input terminal #4 must be high (at or near +Vcc).

Comparator circuit 116 serves as a buffer between an output connection 52 from sensing circuit 50 and an input-to-timing circuit 112 and a reset input of bistable circuit 114. In particular, circuit 116 inclues an operational amplifier 170, a signal input resistor 172 connected in series between connection 52 of sensing circuit 50 and the noninverting (+) input of operational amplifier 170, and a reference input resistor 174 connected to apply a predetermined fraction of the supply voltage +Vcc to the inverting (−) input of amplifier 170. In this instance, a fraction of 0.8 Vcc is applied through resistor 174 to establish a reference level for comparator circuit 116 relative to which the voltage at output connection 52 of sensing circuit 50 is compared. As described in the aforementioned U.S. patents, the output voltage at connection 52 is normally high (+Vcc) and swings low whenever sensing circuit 50 detects that line L1 is in an off-hook condition. Output 52 remains low so long as the off-hook condition continues and swings back high when line L1 goes on-hook. Thus by appropriate selection of the reference voltage input applied via resistor 174 to lie between the high and low voltage swings applied to the signal input resistor 172, comparator circuit 116 assumes one of two discrete states in which output 140 is either high or low, depending upon the condition of the associated telephone line.

When the telephone line is on-hook (idle) output 140 is high, and when the telephone line is off-hook (busy) output 140 is low. During a hold condition on the line, comparator circuit 116 follows the fluctuating hold signal sensed by sensing circuit 50, and comparator output 140 swings alternating high and low at the hold flash rate.

The voltage level at input terminals #2 and #6 is responsive to transistions in the voltage output from comparator circuit 116, as modified by the RC time constants of resistors 132, 136, diode 134 and capacitor 138 which couple the output of comparator 116 to the input terminals of timer 130. When line L1 is on-hook, output 140 of comparator circuit 116 is high (near +Vcc) and as such rapidly charges capacitor 138 through resistor 132 and the forwardly biased diode 134 shunting resistor 136. Terminals #2 and #6 of timer 130 are thus held normally high. When output 140 swings low (at or near ground potential) during an off-hook condition on the line, capacitor 138 commences to discharge, but now must discharge through the serial connection of both resistors 136 and 132 inasmuch as diode 134 will now be reverse biased. The longer time constant provided by the serial resistance of resistors 136 and 132 (compared to resistor 132 by itself) and the capacitance of capacitor 138 determines the amount of time required for the voltage at timer terminals #2 and #6 to drop to the above mentioned ⅓+Vcc level. The required decay time establishes the above mentioned predetermined delay interval that occurs between the appearance of an off-hook condition on the associated line, L1 in this instance, and the switching of gate 110 from the quiescent to the exclusion mode.

Also, as described more fully hereinafter, the different time constants provided by the nonlinear RC network cause timer circuit 112 to discriminate againt a fluctuating hold indicating signal at the comparator output 140 and against an alternating ring indicating signal so that time 130 is maintained in the set state (quiescent mode) when there is a hold condition on the line and when ringing on-hook, as well as when the line is on-hook and silent.

In this embodiment, bistable circuit 114 is provided by an operational amplifier 150 connected in circuit with a positive feedback resistor 152, a reference voltage input resistor 154 and a set signal input resistor 156. Feedback resistor 152 is connected between an output 158 of amplifier 150 and the noninverting (+) input of amplifier 150 so as to cause the amplifier to saturate in either of two operating modes, thereby creating two stable states. The inverting (−) input of amplifier 150 is connected to the junction betwen resistors 154 and 156 which form a voltage divider network between the potential on lead 126b to which resistor 156 is connected and the supply voltage+Vcc which is connected to resistor 154. Additionally, the noninvertive (+) input of amplifier 160 is coupled to the output 140 of comparator circuit 116 by serial connected diode 160 and capacitor 162 which serve as a reset input to circuit 114. The resulting bistable circuit functions as a reset-set latch, having a normal reset state in which output 158 connected to terminal #4 of timer 130 enables the above described timing operation of timer 130 and a set state in which output 158 of amplifier 150 is low, inhibiting time 130 from responding to input terminals #2 and #6 and thus maintaining Q1 of gate 110 in the quiescent mode.

Bistable circuit 114 is switched from the normal reset state to a set state by a high going signal on lead 126b via gate 110 and a lead 126a whenever actuation of switch S1 is effective to operate the associated switching network 802 and associated relay 24 or, in other words, so long as gate 110 remains in its quiescent, nonexclusion state. The high going voltage swing on lead 126 is coupled through resistor 156 to the negative input of operational amplifier 150, causing that input to be momentarily more positive than the positive input to which feedback resistor 152 is connected, hence relieving the operational amplifier from its saturated condition and switching it to another stable state, namely its set state, in which output 158 is low (at or near ground potential). As described above, when output 158 is low, timer 130 is inhibited from switching gate 110 to the exclusion mode and hence, so long as bistable circuit 114 remains in its set state, selector switch S1 continues to be effective in operating switching network 802 and line relay 24 via leads 126a and 126b. This inhibit function of circuit 114 serves, as described more fully hereinafter, to maintain the effectiveness of the line selector switch S1 so that unit 14 is capable of being operated to establish a conference call.

Bistable circuit 114 is switched back to its reset state by a signal that is developed at the output 140 of comparator circuit 116 and is coupled to the noninverting input of amplifier 150 via diode 160 and capacitor 162. When output 140 of comparator circuit 116 swings high after a ling goes back on-hook or to a hold condition, the resulting positive voltage swing is coupled through the forwardly biased diode 160 and capacitor 162 to momentarily cause the noninverting input of amplifier 150 to rise above the inverting input, thereby resetting circuit 114 with output 158 latched high (at or near +Vcc).

Exclusion circuit 100' for line L2 is identical to exclusion circuit 100. As described above for circuit 100 the signal controlled gate for L2 (corresponding to gate 110 above) is connected in series with leads 196a and 196b that extend between the L2 selector switch S2 and the L2 switching network (latch) 804 of line select 80.

Similarly, the exclusion circuits for L1 and L2 in the control units of stations #2 and #3, and in any other additional stations that may be provided, may be identical to the above specifically disclosed construction of exclusion circuit 100.

OPERATION

Assume that both lines L1 and L2 are idle. Now an incoming call originates on line L1 causing the telephone sets at each of stations #1, 2 and 3 to ring. Station #1 answers by lifting set 13 (FIG. 1) off-hook and concurrently actuating line select switch S1. Exclusion circuit 100 of control unit 14, at station #1, is in the quiescent mode and allows selector switch S1 to operate and latch the L1 line relay 24. At each of the other stations #2 and #3 of system 11 the exclusion circuits associated with line L1 switch, after a predetermined delay interval, to the exclusion mode, preventing the selector switches S1 at these other stations from operating their associated L1 line relays. The time delay interval is determined by the values of capacitor 138 and resistors 132 and 136 of timing circuit 112. This delay period will usually be set for the same interval for all the exclusion circuits of the key telephone system. The precise amount of time delay is not critical, but will normally be selected to provide enough of a delay so as to not immediately exclude other stations from coming on the line at the beginning of a call when the presence of other stations on the line is both known and desired. On the other hand, the time delay interval should not be so long that other stations are allowed access to a busy line well after the connection has been established. By way of example, a delay interval of about 4½ seconds has been found suitable for these purposes. Also, in the disclosed embodiment this delay interval must be sufficient so as to discriminate against the presence of an on-hook ringing signal which causes the output 140 of comparator circuit 116 to go low during the active portion of the intermittent ringing signal.

It is observed that at each of the stations it is only the exclusion circuits associated with line L1, i.e., the line that assumed the busy condition, which are switched into the exclusion mode. All the exclusion circuits for line L2, including exclusion circuit 100′ of control unit 14, remain in the quiescent, nonexclusion mode, so long as line L2 remains idle.

Furthermore, it is noted that the particular exclusion circuit at the station which initiated the busy condition on the line, namely exclusion circuit 100 at station #1, remains in the quiescent, nonexclusion mode because of the inhibiting function of bistable circuit 114. The inhibiting feature of circuit 114 permits gate 110 of exclusion circuit 100 to continue to communicate signals from line selector switch S1 to line L1 switching network 802 in order to accept simultaneous actuation of both selector switches S1 and S2 for establishing a three point conference call. As described in the above mentioned U.S. patents, a conference call can be established with this type of KTS control unit by simultaneously operating line selector switches S1 and S2 at a given control unit, such as unit 14. In such case both the line relays 24 and 26 are latched by networks 802 and 804 so as to concurrently connect both lines L1 and L2 to the station set 13. The concurrent latching of relays 24 and 26 is enabled by circuitry to which switches S1 and S2 are connected, which overrides the normal automatic disconnect operation which, as mentioned above and more fully described in the aforementioned U.S. patents, causes an automatic disconnect of the opposite line when either S1 or S2 is individually actuated. The override of these automatic disconnect signals is accomplished by simultaneous application of supply voltage +Vcc via selector switches S1 and S2 to networks 802 and 804. In conjunction with the exclusion circuitry, the inhibiting function provided by bistable circuit 114 and its cooperation with timer 130 enables the line select switch, namely S1 in the present example, to continue to be effective in communicating +Vcc to the associated switching network 802 for enabling the establishment of the above described three point conference call, even though the line L1 exclusion circuits at each of the remaining stations #2 and #3 have assumed an exclusion mode.

Continuing with the above example, when line L1 goes back on-hook (becomes idle) comparator 116 to responds to the voltage change at the output connection 52 of sensing circuit 50 and swings high. Diode 134 of timing circuit 112 becomes forward biased and capacitor 138 is charged at a relatively rapid rate due to the reduced time constant of the RC circuit which in turn is the result of resistor 136 being bypassed by the positively biased diode 134. When the voltage level at input terminals #2 and #6 rise above ⅔ of Vcc, timer 130 switches its output terminal #3 from high to low, restoring gate 110 to the quiescent, nonexclusion mode.

Concurrently with the foregoing operation, as output 140 of comparator 116 swings high, a positive voltage spike is coupled to the noninverting input of amplifier 150 via diode 160 and capacitor 162, switching the latch provided by bistable circuit 114 to the reset condition, and thereby removing the inhibit signal from terminal #4 of timer 130. It is noted that while the timers, corresponding to the timer 130, of all of the exclusion circuits will switch their associated gates corresponding to gate 110 back to the quiescent mode under the foregoing conditions, it is only the particular bistable circuit 114 that is associated with that station which initiated the call that will need to be reset. The bistable circuits corresponding to circuit 114 at the other stations will remain in their reset states throughout the foregoing operating sequence.

In the above example, assume now that line L1, while still off-hook and connected to set 13 at station #1, is to be placed on hold. At station #1, the hold select switch S3 is actuated and set 13 is placed back on-hook. Line L1 now assumes a hold condition which, as described in the above mentioned U.S. patents, maintains the telephone connection at the central office but allows L1 to be disconnected from station set 13 by opening line relay 24 (FIG. 1). The hold condition on line L1, as detected by sensing circuit 50, causes output connection 52 to swing between high and low voltage levels which cause the indicator light IL1 to flash, signalling the existence of the hold condition. This fluctuating hold signals appears at output 140 of comparator circuit 116 as a corresponding alternately high-low fluctuating signal. On the high going swing of the voltage at output 140, diode 134 of timing circuit 112 is forward biased, thus bypassing resistor 136 and charging capacitor 138 at a time constant rate that is substantially faster than the discharge rate through both resistors 132 and 136 when diode 134 is reverse biased. This relatively short RC time constant is made as fast acting as practical and, by way of example, an interval of 10 milliseconds has been found suitable for this short timing mode. Thus capacitor 138 is quickly charged to a level greater than the combined switching thresholds of input terminals #2 and #6 of timer 130, switching the timer output at terminal #3 low and maintaining it low through the succeeding cycles of fluctuation of the hold signal. Q1 of gate 110 responsively resumes its quiescent state and enables S1 to operate switching network 802 and line relay 24.

Also, on the initial high going swing of output 140 as described immediately above, it causes a positive voltage spike to be applied to the noninverting input of amplifier 150 via diode 160 and capacitor 162 which resets bistable circuit 114, removing the inhibit signal at terminal #4 of timer 130.

The operating characteristics of the other exclusion circuits, including L2 exclusion circuit 100′ of unit 14, and the corresponding exclusion circuits at the other stations #2 and #3 are the same as the operation described above for circuit 100.

While only a particular embodiment of the invention has been disclosed herein, it will be readily apparent to persons skilled in the art that numerous changes and modifications can be made thereto without departing from the spirit of the invention. For example, the timing function of circuit 112 is established by analog RC timing components operating in conjunction with integrated timer circuit 130. Alternatively, a digital timer may be utilized for circuit 112 wherein the time delay would be affected by selective generation and/or accumulation of clock pulses by a digital counter. Also, while the foregoing embodiment of the exclusion circuit receives line condition signal information indirectly from a separate line condition sensing circuit (i.e., circuits 50 and 60), alternatively, the timing circuitry 112 can be designed for direct coupling to the line interface circuits (i.e., circuits 30 and 40) which transmit line condition information. These and other modifications will be evident to those skilled in the art.

The embodiments of the invention in which an exclusive property or privilege is claimed are defined as follows:

1. An exclusion circuit for establishing line privacy in a key telephone system of the type having a plurality of control units, one for each of a plurality of phone stations, for connecting a selected one of two or more telephone lines to a phone set at each such station, and wherein each control unit includes for each available telephone line, a line switching device for connecting the associated telephone line to the station set, a line condition sensing means for sensing the conditions of on-hook, off-hook and hold on the associated telephone line, and a latching circuit for each line switching device that responds to a line selector switch and to the line condition sensing means to operate and latch the associated line switching device in a state that connects the associated line to the station phone set, wherein said exclusion circuit is provided in at least one of said control units for at least a given telephone line and comprises in combination therewith:
   a signal controlled gate means connected in circuit with the line selector switch and the latching circuit that are associated with said given telephone line, said gate means having a quiescent mode in which said line selector switch is effective, when actuated, to cause said latching circuit means to operate said line switching device, and having an exclusion mode in which said latching circuit means is unresponsive to actuation of said line selector switch; and
   timing circuit means connected to said signal controlled gate means and to the sensing means associated with said given line for disposing said gate means in said quiescent mode when said line condition sensing means senses either an on-hook or hold condition on the given telephone line, and for disposing said gate means in said exclusion mode after a first predetermined delay interval from the time that said sensing means senses an off-hook condition on the given line.

2. The exclusion circuit of claim 1, wherein said line selector switch associated with the given line has manually actuated momentary contacts, and said signal controlled gate means is serially connected in a signal path extending between said contacts and said latching circuit.

3. The exclusion circuit of claim 1, wherein said timing circuit means includes means for providing a first timing mode that is effective to cause said first predetermined delay interval when said sensing means senses said off-hook condition and for providing a second timing mode that is effective to cause said gate means to be restored to said quiescent mode after a second predetermined delay interval from the time that said sensing means senses a change from an off-hook condition to an on-hook or hold condition on the given line, and wherein said second predetermined delay interval is substantially shorter than said first predetermined delay interval.

4. The exclusion circuit of claim 1, further comprising an exclusion inhibit circuit means having a normal non-inhibit mode and an inhibit mode, said inhibit circuit means being effective during its inhibit mode to inhibit said timing circuit means from disposing said gate means in the exclusion mode and being effective during said noninhibit mode to not so inhibit said timing circuit means, said inhibit circuit means normally assuming said noninhibit mode and being switched therefrom to said inhibit mode when said line selector switch is actuated during a time in which said gate means is in its quiescent mode, and said inhibit circuit means being redisposed in said noninhibit mode when said sensing means senses a change in the condition of the given line from an off-hook to on-hook or hold condition.

5. In a key telephone system of the type having a plurality of control units, one for each of a plurality of phone stations, for selectively connecting at least first and second telephone lines to a phone set at each such station, and wherein each control unit includes first and second line switching devices for respectively connecting the first and second telephone lines to the station set, first and second line condition sensing means for sensing the conditions of on-hook, off-hook and hold on the first and second telephone lines, respectively, and first and second latching circuits for said first and second switching devices respectively, and first and second line selector switches of the momentary contact type, for said first and second lines respectively, each of said first and second latching circuits being operable in response to said first and second line selector switches and said first and second sensing means, respectively, to operate and latch the associated first and second line switching devices so as to selectively connect the associated first and second lines to the station set, the improvement in each of said control units of a first exclusion circuit for said first telephone line, wherein said first exclusion circuit comprises:
   a signal controlled gate means connected in circuit with said first line selector switch and said first latching circuit means, said gate means having a quiescent mode in which said first line selector swtich is effective, when momentarily actuated, to cause said first latching circuit means to operate said first line switching device, and having an exclusion mode in which said first latching circuit means is unresponsive to actuation of said first line selector switch; and
   timing circuit means associated with said first sensing means and said signal controlled gate means for disposing said gate means in said quiescent mode when said first line condition sensing means senses either an on-hook or hold condition on the first telephone line, and for disposing said gate means in said exclusion mode after a predetermined delay interval from the time that said first line condition sensing means senses an off-hook condition on the first line.

6. In the key telephone system of claim 5, wherein such system is further characterized by being of the type in which each of said control units includes circuit means for causing both said first and second latching circuit means to respond to concurrent actuation of said first and second line selector switches to jointly latch said first and second line switching devices in states that concurrently connect both said first and second lines to the associated station set for a conference call, and wherein said first exclusion circuit for each of said control units further comprises:

an exclusion inhibit circuit means for selectively inhibiting said exclusion mode of said signal controlled gate means during an off-hook condition on said first telephone line for that one of said control units which initially establishes said off-hook condition so that said first line selector switch of such last mentioned control unit is continuously effective during said off-hook condition to cooperate concurrently with said second line selector switch for establishing said conference call.

7. In a key telephone system of the type having a plurality of control units, one for each of a plurality of phone station, for connecting a selected telephone line to a phone set at each such station, and wherein control unit includes a line switching device for connecting the telephone line to the station set, a line condition sensing means for sensing the conditions of on-hook, off-hook and hold on the telephone line, and a latching circuit for said line switching device that responds to a line selector switch and to said condition sensing means to operate and latch said line switching device in a state that connects the line to the station phone set, the improvement of an exclusion circuit in combination with at least one of said control units for providing line privacy, comprising:

a signal controlled circuit means associated with said line selector switch and said latching circuit of the one of said control units, said signal controlled circuit means having a quiescent mode in which said line selector switch is effective, when actuated, to cause said latching circuit means to operate said line switching device, and having an exclusion mode in which said latching circuit means is unresponsive to actuation of said line selector switch; and control signal means connected to said signal controlled circuit means and to said sensing means of the one of said control units for disposing said signal controlled circuit means in said quiescent mode when said sensing means senses either an on-hook or hold condition on the telephone line, and for disposing said signal controlled circuit means in said exclusion mode when said sensing means senses an off-hook condition on the line.

8. The improvement of claim 7, wherein said line selector switch is of a manually actuated momemtary type, and said signal controlled circuit means is a gate that is serially connected in a signal path extending between said selector switch and said latching circuit.

9. The improvement of claim 7, wherein said control signal means comprises timing circuit means for disposing said signal controlled circuit means in said exclusion mode after a first predetermined delay interval from the time that said sensing means senses said off-hook condition.

10. The improvement of claim 9, wherein said timing circuit means includes means for providing a first timing mode that is effective to cause said first predetermined delay interval when said sensing means senses said off-hook condition and for providing a second timing mode that is effective to cause said signal controlled circuit means to be restored to said quiescent mode after a second predetermined delay interval from the time that said sensing means senses a change from an off-hook condition to an on-hook or hold condition on the line, and wherein said second predetermined delay interval is substantially shorter than said first predetermined delay interval.

* * * * *

UNITED STATES PATENT AND TRADEMARK OFFICE
CERTIFICATE OF CORRECTION

PATENT NO. : 4,218,590
DATED : August 19, 1980
INVENTOR(S) : Harry R. Rasmussen et al.

It is certified that error appears in the above-identified patent and that said Letters Patent are hereby corrected as shown below:

Column 3, line 27, "use " is changed to --used--.

Column 6, line 46, "inclues" is changed to --includes--.

Column 7, line 36, "againt" is changed to --against--.

Column 8, line 28, "ling" is changed to --line--.

Column 9, line 58, "to" is deleted.

Column 13, line 16, "station" is changed to --stations--.

Column 13, line 17, --each-- is inserted after "wherein".

Signed and Sealed this

Twenty-fourth Day of February 1981

[SEAL]

Attest:

RENE D. TEGTMEYER

Attesting Officer

Acting Commissioner of Patents and Trademarks